United States Patent
Takenaka et al.

(10) Patent No.: US 7,234,769 B2
(45) Date of Patent: Jun. 26, 2007

(54) VEHICLE SEAT

(75) Inventors: Kenichi Takenaka, Chiryuu (JP); Masato Ohchi, Toyota (JP); Hiroshi Tamura, Toyota (JP); Hiroyoshi Yamaguchi, Yokohama (JP); Makoto Hasegawa, Yokohama (JP); Takeshi Itoh, Yokohama (JP)

(73) Assignees: Toyota Jidosha Kabushiki Kaisha, Toyota (JP); NHK Spring Co., Ltd., Yokohama (JP)

( * ) Notice: Subject to any disclaimer, the term of this patent is extended or adjusted under 35 U.S.C. 154(b) by 85 days.

(21) Appl. No.: 11/143,648

(22) Filed: Jun. 3, 2005

(65) Prior Publication Data

US 2006/0033376 A1   Feb. 16, 2006

(30) Foreign Application Priority Data

Jun. 22, 2004   (JP)   ............................. 2004-184137

(51) Int. Cl.
*B60N 2/42* (2006.01)
(52) U.S. Cl. ........................... 297/216.12; 297/216.13; 297/216.14; 297/410
(58) Field of Classification Search ................ 297/391, 297/410, 216.12, 216.13, 216.14
See application file for complete search history.

(56) References Cited

U.S. PATENT DOCUMENTS

| | | | | |
|---|---|---|---|---|
| 5,823,619 A | * | 10/1998 | Heilig et al. | ........... 297/216.12 |
| 5,882,071 A | * | 3/1999 | Fohl | ........................ 297/216.12 |
| 6,082,817 A | * | 7/2000 | Muller | .................... 297/216.12 |
| 6,273,511 B1 | * | 8/2001 | Wieclawski | ............... 297/463.1 |
| 6,550,856 B1 | * | 4/2003 | Ganser et al. | ................. 297/61 |
| 6,749,256 B1 | | 6/2004 | Klier et al. | |
| 6,789,846 B2 | * | 9/2004 | Humer et al. | ........... 297/216.12 |
| 6,824,212 B2 | * | 11/2004 | Malsch et al. | .......... 297/216.12 |
| 6,871,913 B2 | * | 3/2005 | Malsch et al. | ............... 297/410 |

FOREIGN PATENT DOCUMENTS

| | | |
|---|---|---|
| DE | 199 51 967 A1 | 5/2001 |
| DE | 100 60 764 C1 | 1/2002 |
| JP | A 2001-163099 | 6/2001 |

* cited by examiner

*Primary Examiner*—David R. Dunn
*Assistant Examiner*—Erika Garrett
(74) *Attorney, Agent, or Firm*—Oliff & Berridge, PLC

(57) ABSTRACT

When a vehicle is rear-ended and a seated user moves rearward in reaction to the rear-end collision, a load movement of a lumbar part of the seated user is sufficiently transmitted from a pressure plate of operating force generating means to an operating force generating mechanism, regardless of an amount of rearward tilting of a seat back. Then, a pressure roller serving as a driven member of the operating force generating mechanism largely deflects and sufficiently pulls inner cables of respective pulling cable devices, thereby smoothly moving both end portions of a headrest frame upward. As a result, the headrest frame is moved upward smoothly and reliably, and a headrest is moved in an upward-forward direction, that is, toward the head of the seated user smoothly and reliably.

6 Claims, 16 Drawing Sheets

VEHICLE SEAT

INCORPORATION BY REFERENCE

The disclosure of Japanese Patent Application No. 2004-184137 filed on Jun. 22, 2004 including the specification, drawings and abstract is incorporated herein by reference in its entirety.

BACKGROUND OF THE INVENTION

1. Field of the Invention

The invention relates to a vehicle seat in which a headrest is attached to a seat back.

2. Description of the Related Art

Usually, a headrest is attached to a seat back of a vehicle seat, in order to protect the head of a seated user in the event that the vehicle is rear-ended. The headrest is usually arranged at a position that is slightly apart from the head of the seated user in the rearward direction such that the head of the seated user is prevented from inappropriately contacting the head rest when the vehicle is driven.

Japanese Patent Application Publication No. JP(A) 2001-163099 discloses a known vehicle seat of the above-mentioned type. According to the technology disclosed in Japanese Patent Application Publication No. JP(A) 2001-163099, when a vehicle is rear-ended and the upper body of a seated user moves rearward in reaction to the rear-end collision, a load generated by this rearward movement is transmitted to right and left headrest holders (headrest supporting brackets) and therefore a headrest is moved upward while being tilted forward, whereby the head and the neck of the seated user are protected.

In the vehicle seat disclosed in Japanese Patent Application Publication No. JP(A) 2001-163099, passive means provided in a seat back transmits the load generated by the rearward movement of the upper body (back) of the seated user to the headrest holder. In the case where the seat back is largely tilted in the rearward direction, the situation may occur in which the load generated by the rearward movement cannot be sufficiently transmitted to the headrest holder and therefore the headrest cannot be reliably moved upward while being tilted forward.

In addition, the passive means is formed mainly of a belt provided in a center portion of a seat back, which is located between the right and left headrest holders. The load generated by the rearward movement of the upper body of the seated user is transmitted to the right and left headrest holders via the belt provided in the center portion. Therefore, the loads received by the right and left headrest holders are likely to be unequal. As a result, the situation may be caused in which the headrest is tilted in an undesired direction, and cannot be smoothly moved upward while being tilted forward.

SUMMARY OF THE INVENTION

It is an object of the invention to provide a vehicle seat in which a headrest can be smoothly and reliably moved toward a head of a seated user regardless of an amount of rearward tilting of a seat back, when a vehicle is rear-ended.

According to a first aspect of the invention, there is provided a vehicle seat, including a seat back frame; headrest supporting brackets which are provided in a seat back, and to which a headrest is attached; a headrest frame which is movably coupled with the seat back frame such that the headrest can be moved toward a head of a seated user; a pivot which tiltably supports the seat back frame; an operating force generating device which is provided near the pivot, and which generates an operating force when receiving a load generated by a rearward movement of the seated user; and an operating force transmitting device which moves the headrest frame in accordance with an operation of the operating force generating device.

In the vehicle seat according to the first aspect, when the vehicle is rear-ended and the lumbar part of the seated user moves rearward in reaction to the rear-end collision, the operating force generating device generates an operating force when receiving a load generated by the rearward movement, and the operating force transmitting device smoothly moves the headrest frame in accordance with the operation of the operating force generating device. The operating force generating device is provided in an area near a pivot of the seat back, and an amount of positional displacement of the area, which is caused due to the rearward tilting of the seat back, is small. Accordingly, the load generated by the rearward movement of the lumbar part of the seated user is sufficiently transmitted to the operating force generating device regardless of the amount of rearward tilting of the seat back, and therefore a sufficient amount of operating force is reliably generated. As a result, the headrest frame is smoothly and reliably moved along with the headrest support brackets, and the headrest attached to the headrest support brackets is moved toward the head of the seated user smoothly and reliably. The head rest is attached to the headrest support brackets with headrest stays arranged between the headrest and the respective headrest support brackets.

In the first aspect, the operating force generating device may be supported by the seat back frame. In the vehicle seat according to the invention, preferably, the operating force generating device is supported by a rigid seat back frame.

In the first aspect, a portion of the seat back frame, which supports the operating force generating device may be a lower frame forming a lower portion of the seat back frame.

In the first aspect, the operating force transmitting device may be formed of paired pulling cable devices, and the operating force generating device may be configured such that a driven member, which is pressed and moved due to the load generated by the rearward movement of the seated user, pulls inner cables of the respective pulling cable devices. Preferably, the operating force transmitting device which moves both end portions of the headrest frame is paired lightweight pulling cable devices which can be easily arranged in the seat back. In this case, the operating force generating device may be configured such that the driven member, which is pressed and moved due to the load generated by the rearward movement of the seated user, pulls inner cables of the respective pulling cable devices.

In the first aspect, the operating force generating device may be configured such that the inner cables are pulled, when the driven member is pressed toward the inner cables, whereby the inner cables are deflected In the first aspect, the operating force generating device may include a pressure plate which receives the load generated by the rearward movement of the seated user, thereby pressing and moving the driven member. Thus, the load generated by the rearward movement of the seated user can be reliably transmitted to the driven member.

In the first aspect, the pressure plate may be provided in at least a lower half area of the seat back.

In the vehicle seat according to the first aspect, when the vehicle is rear-ended and the lumbar part of the seated user moves rearward in reaction to the rear-end collision, the operating force generating device receives the load generated by the rearward movement, thereby generating a sufficient amount of operating force regardless of the amount of rearward tilting of the seat back, and the operating force transmitting device smoothly moves the headrest frame in accordance with the operation of the operating force generating device. As a result, the headrest frame is smoothly and reliably moved along with the headrest support brackets, and the headrest attached to the headrest support brackets is moved toward the head of the seated user smoothly and reliably. The headrest is attached to the headrest support brackets with the headrest stays arranged between the headrest and the respective headrest support brackets. Therefore, according to the invention, when the vehicle is rear-ended, the headrest can be smoothly and reliably moved toward the head of the seated user, regardless of the amount of rearward tilting of the seat back. It is therefore possible to reliably reduce an impact on the neck of the seated user.

When the operating force transmitting device is formed of the paired pulling cable devices, the both end portions of the headrest frame can be moved smoothly and reliably. Also, flexibility in arrangement of the operating force transmitting device in the seat back is increased, and an increase in the weight of the operating force transmitting device can be minimized.

According to a second aspect of the invention, there is provided A vehicle seat, including a seat back frame; headrest supporting brackets which are provided in a seat back, and to which a headrest is attached; a headrest frame which is movably coupled with the seat back frame such that the headrest can be moved toward a head of a seated user; a pivot which tiltably supports the seat back frame; operating force generating means for generating an operating force when receiving a load generated by a rearward movement of the seated user, the operating force generating means being provided near the pivot; and operating force transmitting means for moving the headrest frame in accordance with an operation of the operating force generating means.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EXEMPLARY EMBODIMENTS

Figure 1:
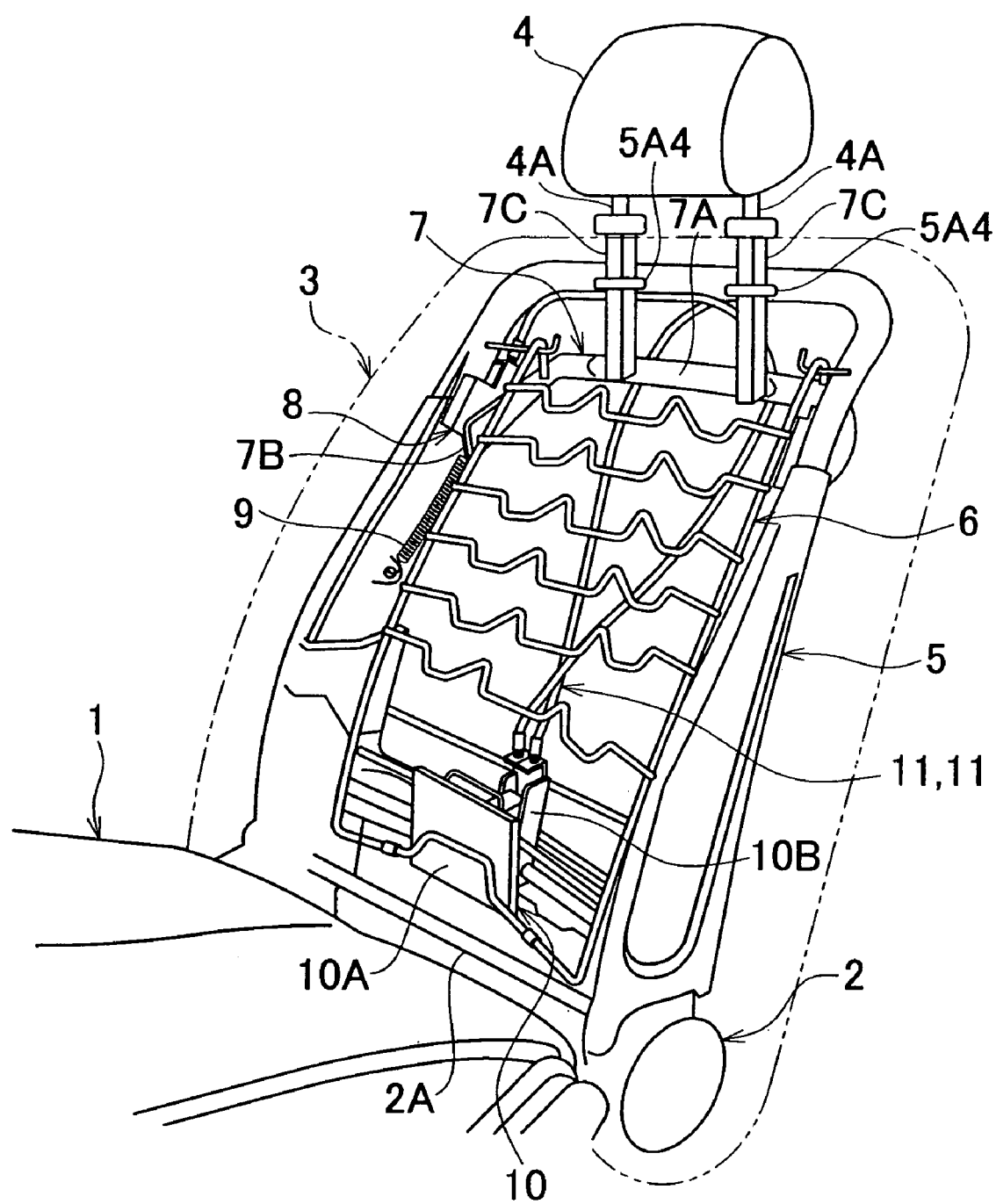
FIG. 1 is a perspective view showing a main portion of a vehicle seat according to a first embodiment of the invention.

Hereafter, a vehicle seat according to an embodiment of the invention will be described with reference to accompanying drawings. FIG. 1 is a perspective view showing a structure of a main portion of a vehicle seat according to a first embodiment of the invention.

As shown in FIG. 1, the vehicle seat according to the first embodiment includes a seat back 3 that is coupled with a rear portion of a seat cushion 1 so as to be tiltable forward/rearward using a tilting mechanism 2. A headrest 4 is detachably attached to an upper portion of the seat back 3 with headrest stays 4A, 4A arranged between the headrest 4 and the seat back 3.

Figure 2:
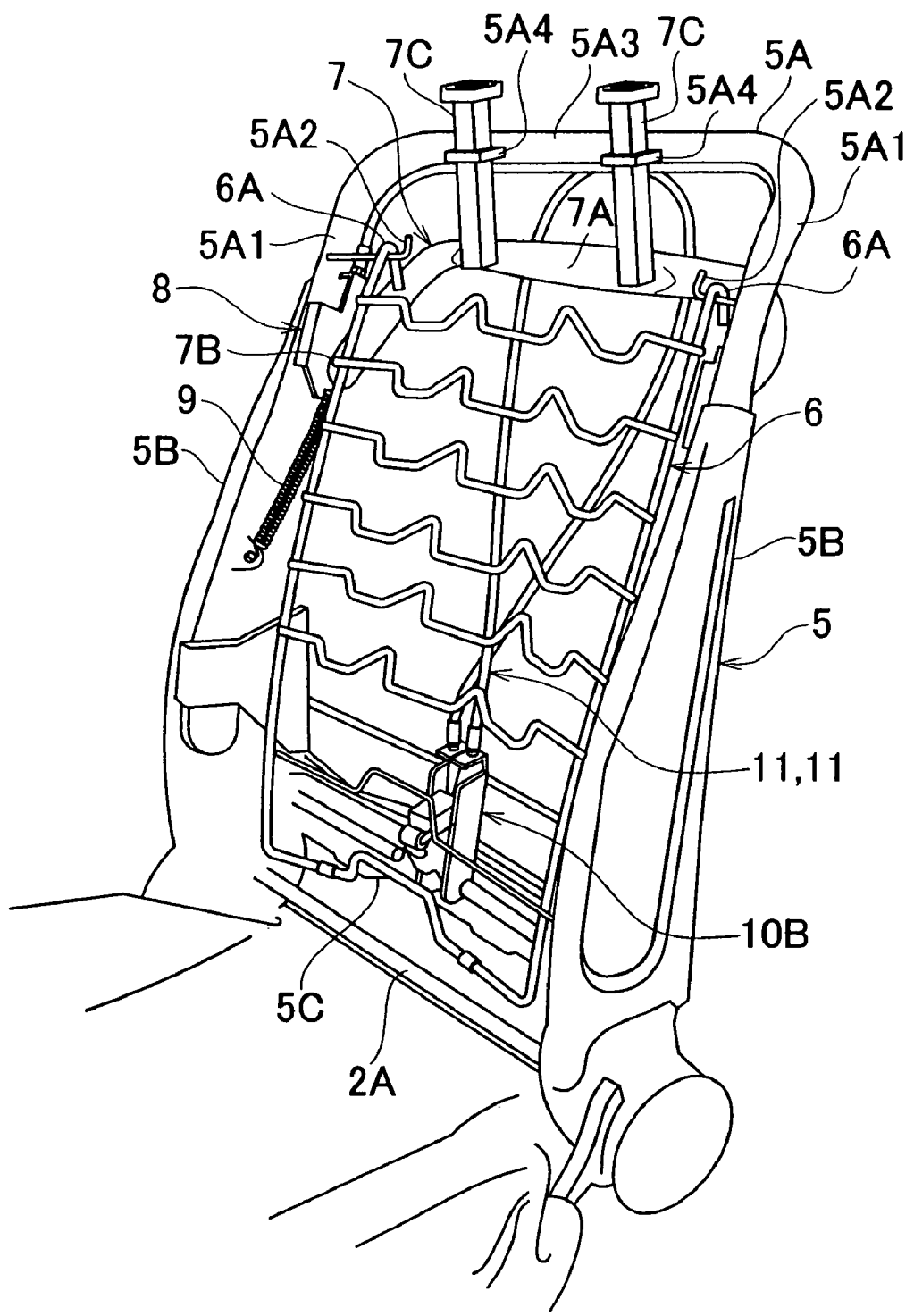
FIG. 2 is a perspective view showing an inner structure of a seat back in FIG. 1.
Figure 3:
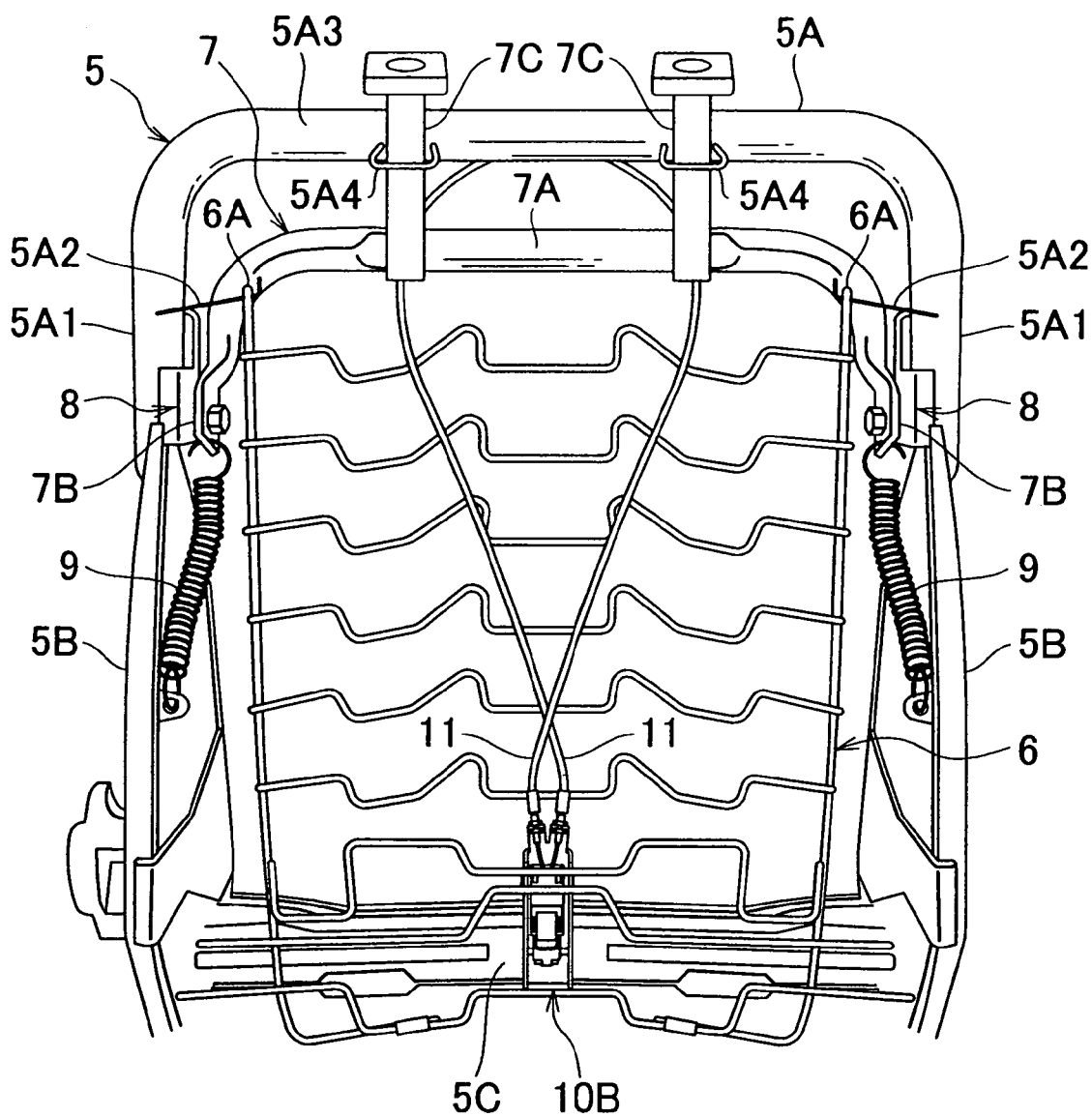
FIG. 3 is a front view showing the inner structure of the seat back in FIG. 2.

In the seat back 3, a seat back frame 5, which is a frame of the seat back 3, is embedded in a seat back pad (not shown) formed of a cushion material, for example, urethane foam. As shown in FIGS. 2 and 3, the seat back frame 5 is formed by connecting an upper pipe 5A, right and left side frames 5B, 5B, and a lower frame 5C integrally with each other by welding. The upper pipe 5A has a portal shape viewed from the front, which is formed by bending. The upper pipe 5A is an upper portion of the seat back frame 5. The lower frame 5C has a strip shape. The lower frame 5C is a lower portion of the seat back frame 5. Lower end portions of the side frames 5B, 5B of the seat back frame 5 are tiltably connected to a pivot 2A of the tilting mechanism 2.

A contour mat 6 is provided inside the seat back frame 5. The contour mat 6 is an elastic mat having a flat shape. The contour mat 6 is formed of wires, for example, piano wires. Engagement hooks 6A, 6A for attaching the contour mat 6 to the seat back frame 5 are formed. One of the engagement hooks 6A, 6A is formed in a right upper portion of the contour mat 6, and the other engagement hook 6A is formed in a left upper portion of the contour mat 6. Support rods 5A2, 5A2, each of which protrudes inward and each of whose end is bent upward, are formed. One of the support rods 5A2, 5A2 is attached to one of vertical pipe portions 5A1, 5A1 of the upper pipe 5A. Similarly, the other support rod 5A2 is attached to the other vertical pipe portion 5A1 of the upper pipe 5A. The vertical pipe portions 5A1, 5A1 extend in the vertical direction. The engagement hooks 6A, 6A are hooked on the respective support rods 5A2, 5A2 such that the upper portion of the contour mat 6 is supported by the seat back frame 5.

As shown in FIGS. 1 to 3, a headrest frame 7, to which the headrest 4 is attached, is arranged in an upper area inside the seatback frame 5. The headrest frame 7 is formed of a pipe member that has a portal shape viewed from the front, which is formed by bending. In the headrest frame 7, a center portion 7A of a portion extending in the horizontal direction, a lower end portion 7B of a right portion extending in the vertical direction, and a lower end portion 7B of a left portion extending in the vertical direction are pressed so as to be flat (refer to FIG. 3). Paired headrest supporting brackets 7C, 7C are attached to a front surface of the center portion 7A of the headrest frame 7 by welding.

Figure 4:
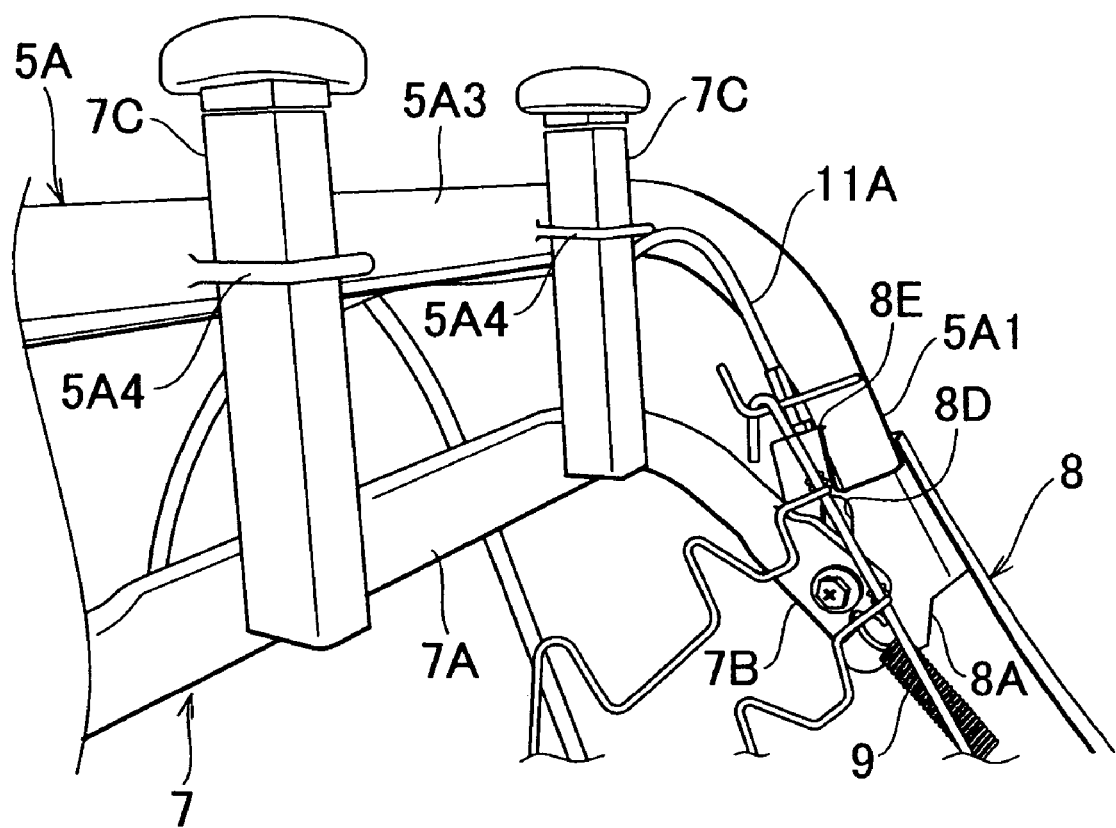
FIG. 4 is a perspective view showing a structure of a portion near headrest supporting brackets in FIG. 3.
Figure 5:
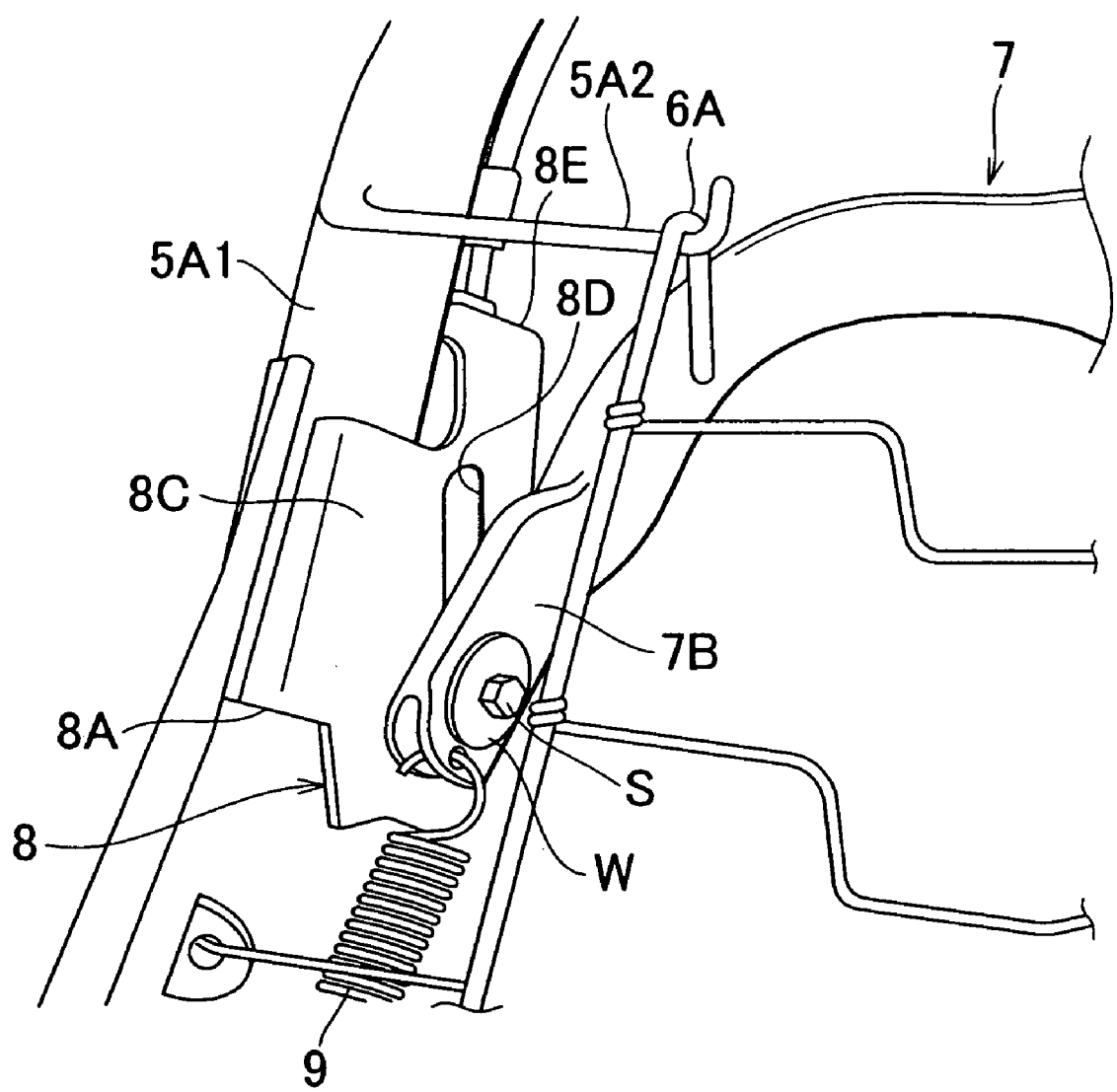
FIG. 5 is a perspective view showing a guide portion in FIG. 3, viewed from the front.

The headrest supporting brackets 7C, 7C protrude upward from the center portion 7A of the headrest frame 7. An upper portion of one of the headrest supporting brackets 7C, 7C is inserted in one of guide rings 5A4, 5A4, which is attached to a front surface of one of lateral pipe portions 5A3, 5A3 of the upper pipe 5A of the seat back frame 5. Similarly, an upper portion of the other headrest supporting bracket 7C is inserted in the other guide ring 5A4 which is attached to a front surface of the other lateral pipe portion 5A3 of the upper pipe 5A of the seat back frame 5 (refer to FIG. 4). The right headrest stay 4A which protrudes from a lower portion of the headrest 4 is inserted in one of headrest supporting brackets 7C, 7C. Similarly, the left headrest stay 4A which protrudes from the lower portion of the headrest 4 is inserted in the other headrest supporting bracket 7C. Thus, the headrest 4 is detachably attached to the headrest frame 7 (refer to FIG. 1).

Both end portions of the headrest frame 7, namely, the right and left flat lower end portions 7B, 7B of the head rest frame 7 are coupled with the seat back frame 5. One of guide portions 8, 8 is arranged between the right lower end portion 7B of the headrest frame 7 and the seat back frame 5. Similarly, the other guide portion 8 is arranged between the left lower end portion 7B of the headrest frame 7 and the seat back frame 5. Thus, the lower end portions 7B, 7B are movable in the vertical direction. As a result, the headrest 4 attached to the headrest frame 7 can be moved in the upward-forward direction, that is, toward the head of the seated user seated in the vehicle seat (refer to FIG. 3). Also, tension springs 9, 9 are provided such that the headrest frame 7 is held at a normal position. One of the tension springs 9, 9 is provided between one of the lower portions 7B, 7B of the headrest frame 7, and one of the side frames 5B, 5B of the seat back frame 5. Similarly, the other tension spring 9 is provided between the other lower portion 7B of the headrest frame 7, and the other side frame 5B of the seat back frame 5.

As shown in FIGS. 3 to 7, each guide portion 8 includes a guide plate 8A and a sliding pin 8B. The guide plate 8A is welded to the vertical pipe portion 5A1 of the upper pipe 5A forming the upper portion of the seat back frame 5. The sliding pin 8B penetrates the flat lower portion 7B of the headrest frame 7, and attached to the lower portion 7B (refer to FIG. 7).

The guide plate 8A has a guide surface 8C overlapped with an outer side surface of the flat lower portion 7B of the headrest frame 7. A guide hole 8D extending in the vertical direction is formed in the guide surface 8C. The sliding pin 8B protrudes outward from the flat lower portion 7B of the headrest frame 7, and slidably penetrates the guide hole 8D formed in the guide plate 8A (refer to FIG. 7). The sliding pin 8B is prevented from being removed by washers W, W.

One of the washers W, W is fixed to an inner end portion of the sliding pin 8B by one of set screws S, S, and the other washer W is fixed to an outer end portion of the sliding pin 8B by the other set screw S.

As shown in FIGS. 1 and 2, in an area near the pivot 2A which supports the seat back 3 such that the seat back 3 is tiltable forward/rearward, operating force generating means 10 is provided on a front surface side of a center portion of the lower frame 5C. The center portion is positioned in the center of the lower frame 5C in the horizontal direction. The lower frame 5C forms the lower portion of the seatback frame 5. When the vehicle is rear-ended and the seated user seated in the vehicle seat moves rearward in reaction to the rear-end collision, the operating force generating means 10 receives the load generated by the rearward movement of the lumbar part of the seated user, and generates an operating force. The operating force generating means 10 includes a pressure plate 10A which receives the load generated by the rearward movement of the lumbar part of the seated user, and an operating force generating mechanism 10B which receives the load via the pressure plate 10A.

Figure 8:
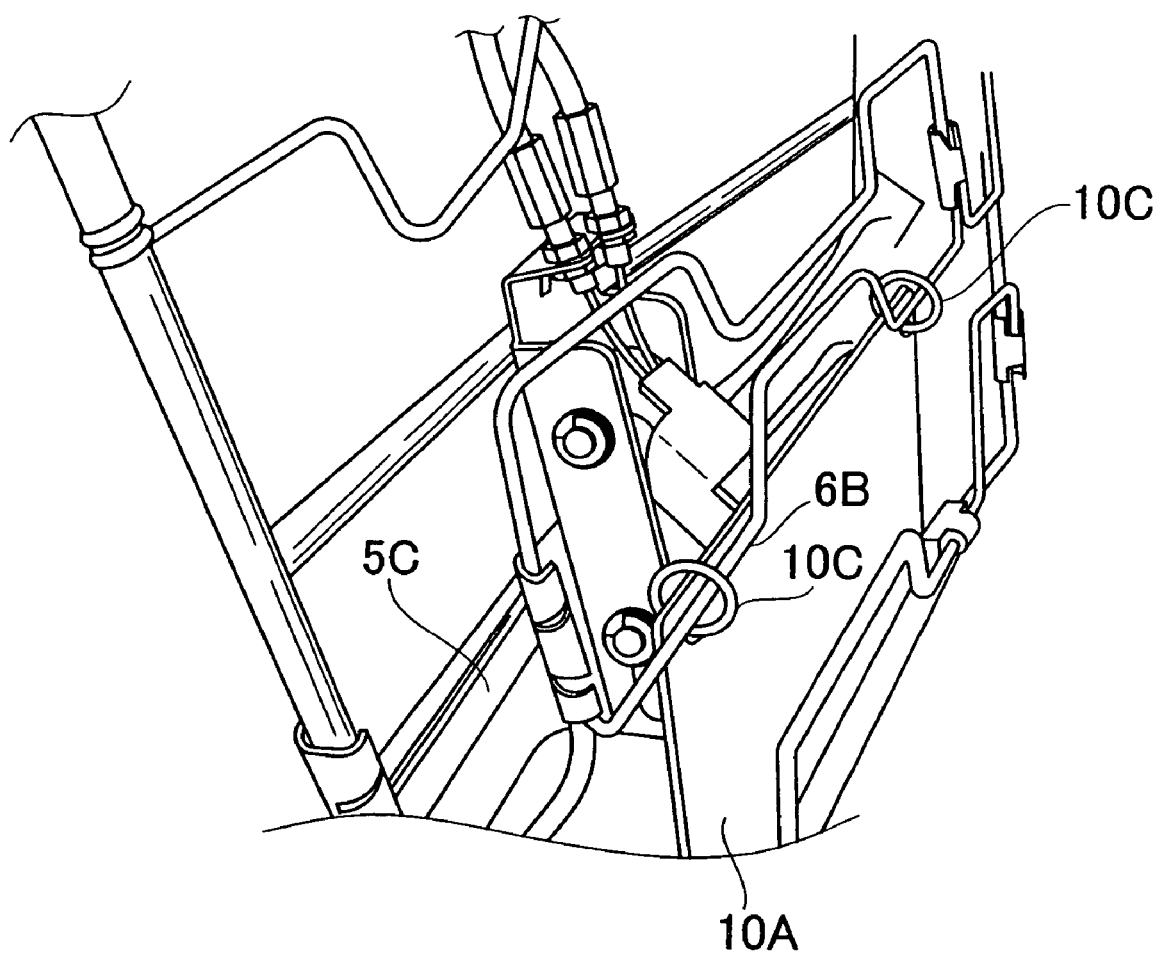
FIG. 8 is a perspective view showing a pressure plate of operating force generating means in FIG. 1, viewed from the front.
Figure 9:
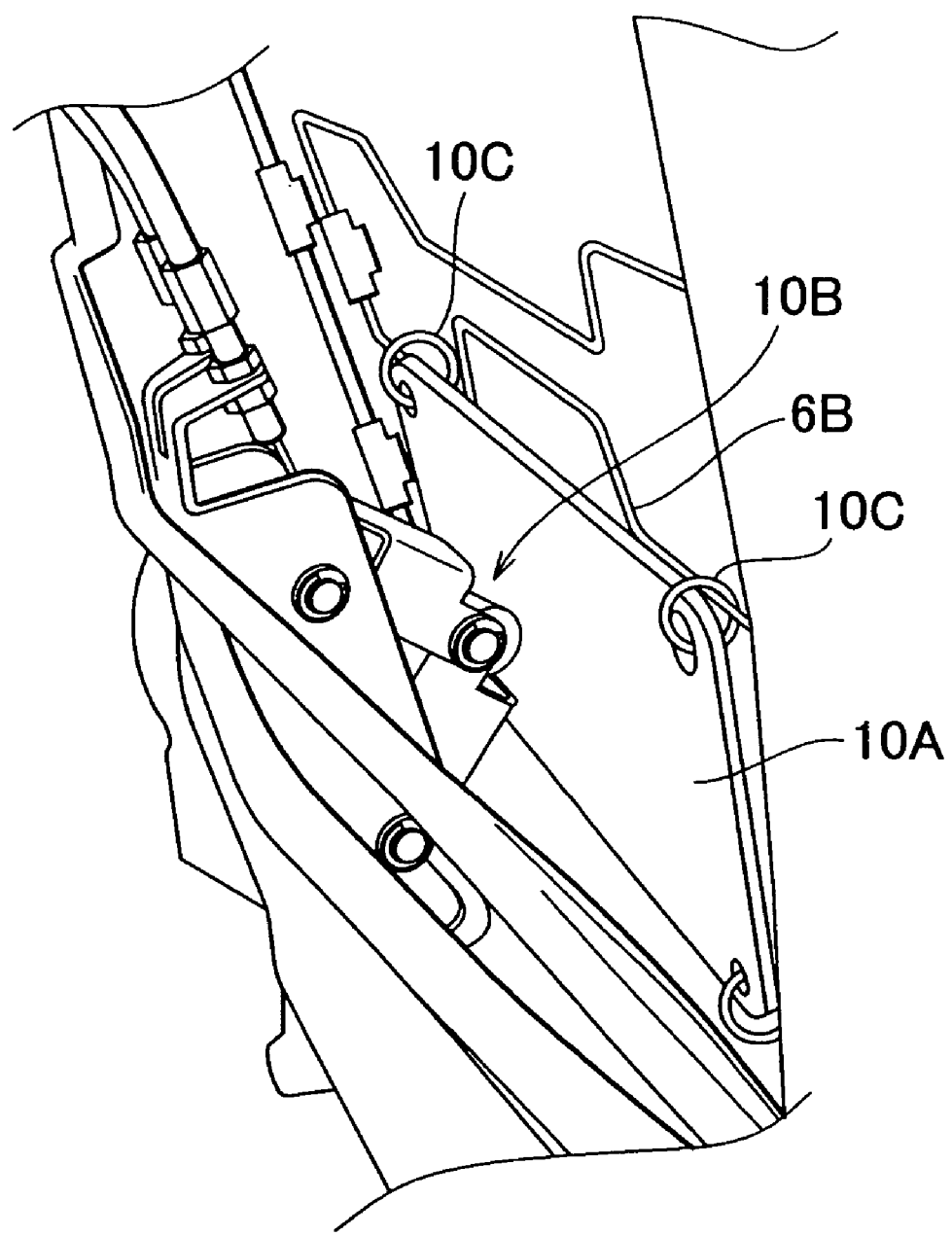
FIG. 9 is a perspective view showing the pressure plate of the operating force generating means in FIG. 1, viewed from the rear.

The pressure plate 10A is formed of, for example, a rectangular synthetic resin plate. As shown in FIGS. 8 and 9, the pressure plate 10A is hung, at right and left two upper portions, from a wire 6B of the contour mat 6 by using coupling rings 10C, 10C. The wire 6B extends in the horizontal direction. Meanwhile, the operating force generating mechanism 10B is provided on a vertically long supporting bracket 10D. The supporting bracket has a groove shape whose front side is open. A backboard (reference numeral is omitted) of the supporting bracket 10D is fixed to the front surface of the rigid lower frame 5C by spot welding or the like.

Figure 10:
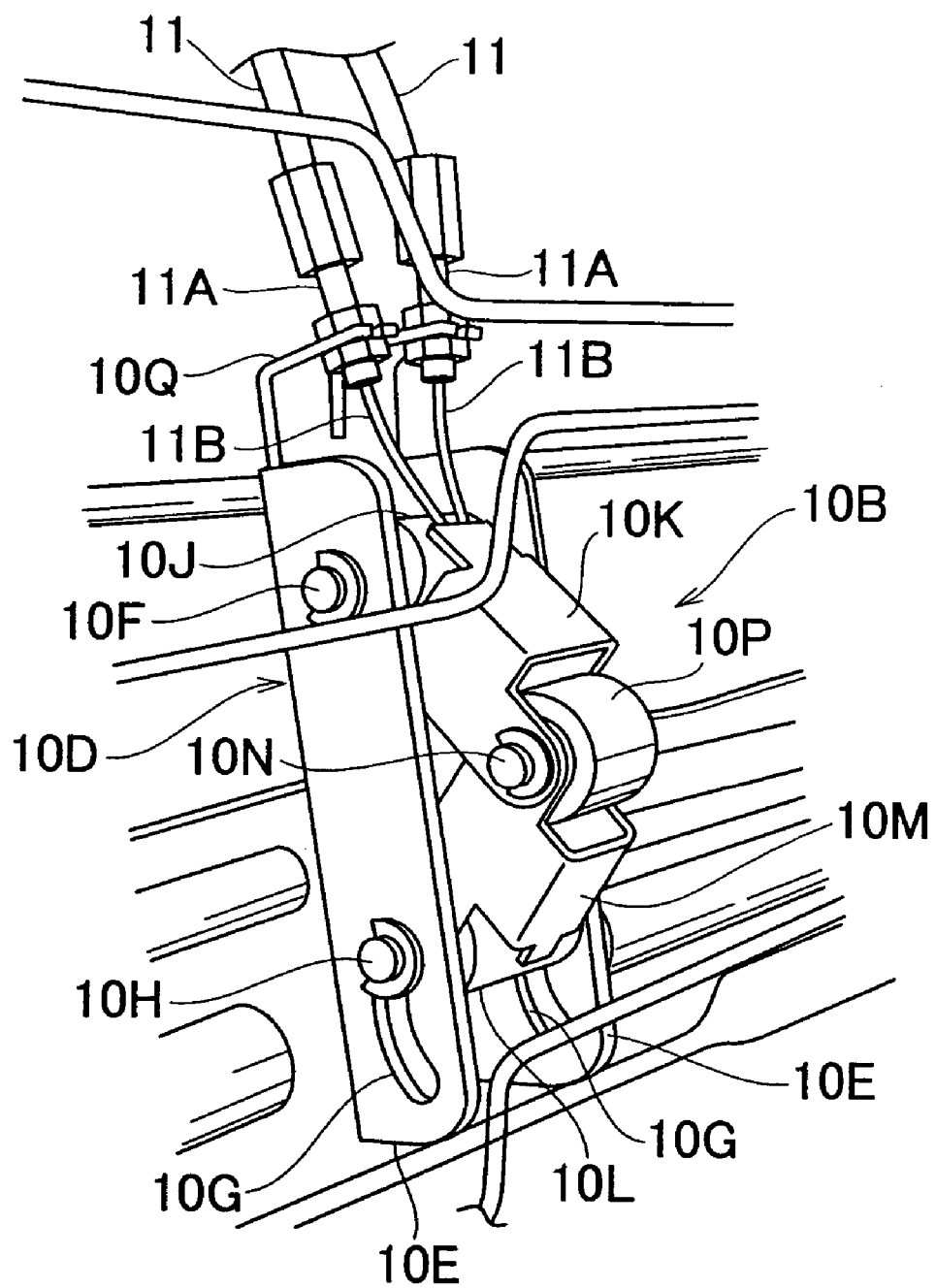
FIG. 10 is a perspective view showing an operating force generating mechanism of the operating force generating means in FIG. 1, viewed from the front.
Figure 11:
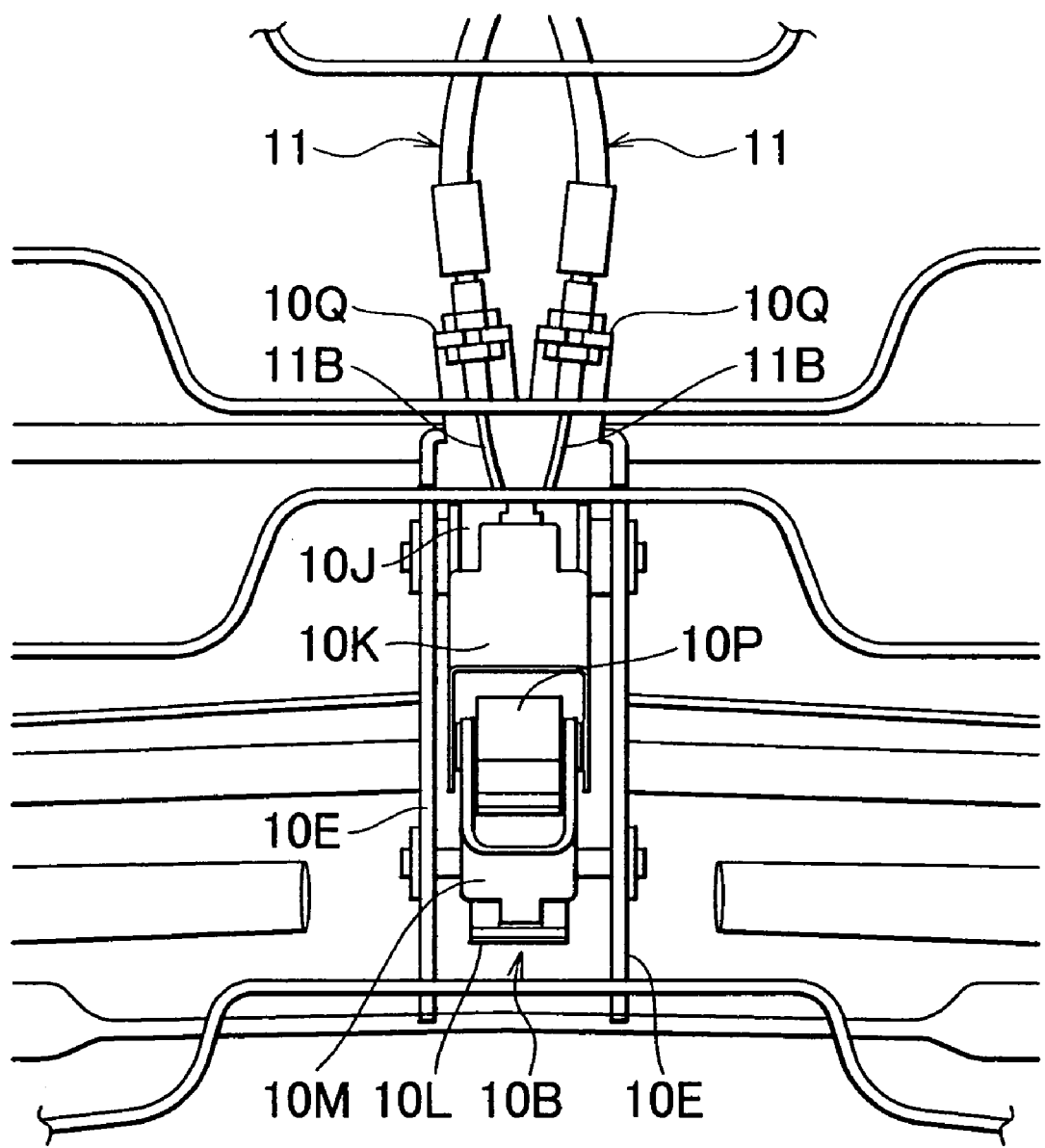
FIG. 11 is a front view showing the operating force generating mechanism of the operating force generating means in FIG. 1.

As shown in FIGS. 10 and 11, the operating force generating mechanism 10B includes a fixed shaft 10F and a movable shaft 10H. The fixed shaft 10F penetrates upper portions of right and left side walls 10E, 10E of the supporting bracket 10D, and are attached to the supporting bracket 10D. The movable shaft 10H penetrates guide holes 10G, 10G One of the guide holes 10G, 10G is formed in a lower portion of the right side wall 10E, and the other guide hole 10G is formed in a lower portion of the left side wall 10E, the guide holes 10G, 10G extending in the vertical direction. The fixed shaft 10F and the movable shaft 10H are attached to the supporting bracket 10D. A fixed roller 10J and an upper end portion of an upper link 10K are rotatably connected to the fixed shaft 10F. A movable roller 10L and a lower end portion of a lower link 10M are rotatably connected to the movable shaft 10H. A lower end portion of the upper link 10K and an upper end portion of the lower link 10M are coupled with each other by using a pivot 10N. A pressure roller 10P serving as a driven member is rotatably connected to the pivot 10N.

As shown in FIGS. 1 to 3, paired pulling cable devices 11, 11 are provided as operating force transmitting means. The pulling cable devices 11, 11 move the headrest frame 7 upward in accordance with the operation of the operating force generating mechanism 10B of the operating force generating means 10. The pulling cable devices 11, 11 include outer sheaths 11A, 11A, respectively. One end portion of one of the outer sheaths 11A, 11A is fitted in one of cable stopper pieces 10Q, 10Q. Similarly, one end portion of the other outer sheath 11A is fitted in the other cable stopper piece 10Q. The cable stopper pieces 10Q, 10Q are formed, by bending, in the upper end portion of the supporting bracket 10D (refer to FIGS. 10 and 11).

One of the outer sheaths 11A, 11A is fixed to the cable stopper piece 10Q on the left side at one end portion. The other end portion of this outer sheath 11A is fixed to a cable stopper piece 8E (refer to FIGS. 5 and 6) that is formed, by bending, in the upper end portion of the guide plate 8A of the guide portion 8 on the left side. The position at which the other end portion of the outer sheath 11A is fixed to the cable stopper piece 8E is on the extension of the line which extends in the direction in which the guide hole 8D extends. Similarly, the other outer sheath 11A is fixed to the cable stopper piece 10Q on the right side at one end portion. The other end portion of this outer sheath 11A is fixed to a cable stopper piece 8E (refer to FIG. 6) that is formed, by bending, in the upper end portion of the guide plate 8A of the guide portion 8 on the right side. The position at which the other end portion of the outer sheath 11A is fixed to the cable stopper piece 8E is on the extension of the line which extends in the direction in which the guide hole 8D extends.

Figure 12:
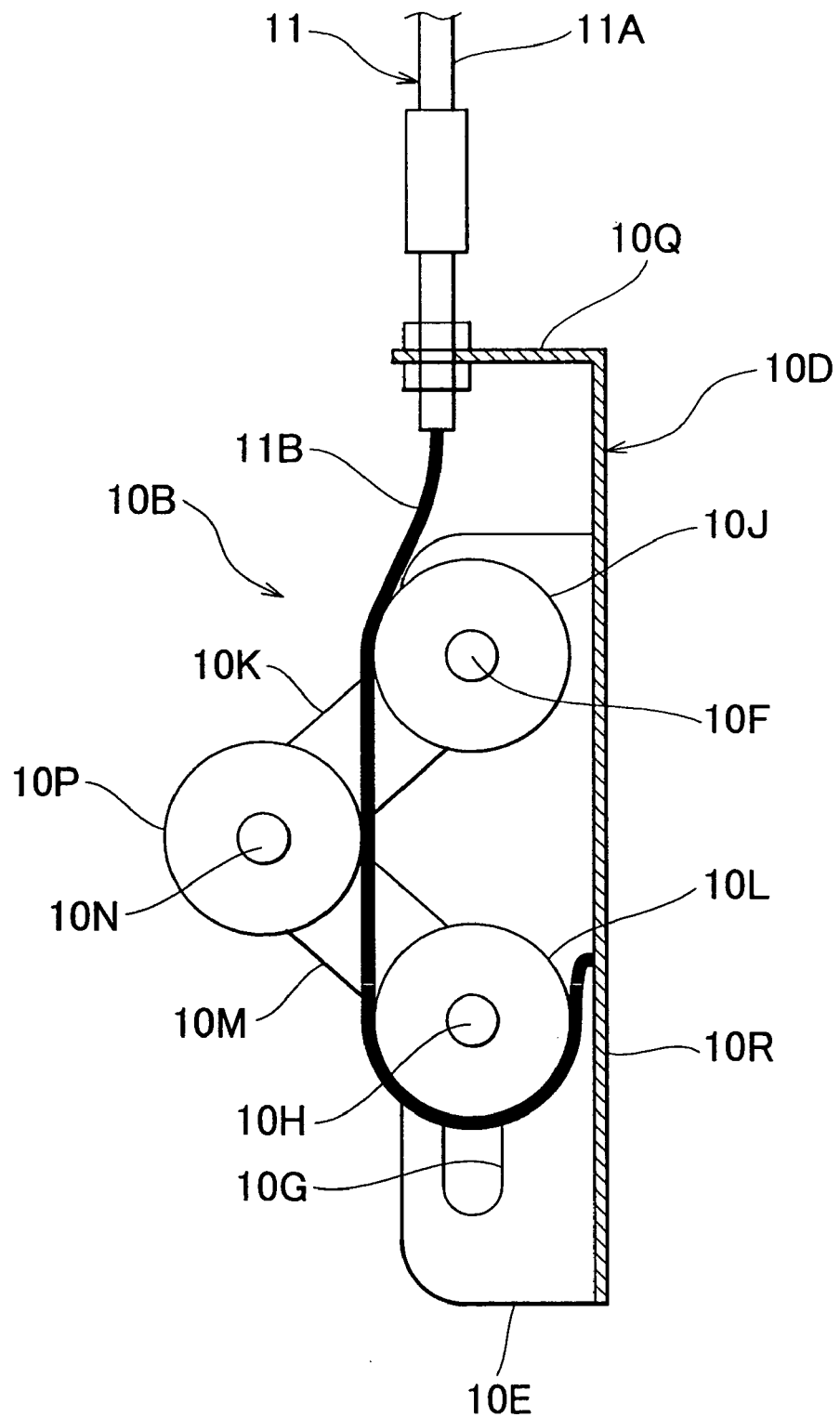
FIG. 12 is a side view schematically showing a structure of the operating force generating mechanism of the operating force generating means in FIG. 1.

One end portion of one of inner cables 11B, 11B, which slidably penetrates one of the outer sheaths 11A, 11A and which comes out of one end portions of this outer sheath 11A, is fixed to a backboard 10R of the supporting bracket 10D. Similarly, one end portion of the other inner cable 11B, which slidably penetrates the other outer sheath 11A and which comes out of one end portion of this outer sheath 11A, is fixed to the backboard 10R of the supporting bracket 10D. The inner cables 11B, 11B are routed on the front surface side of the fixed roller 10J, on the rear surface side of the pressure roller 10P, and on the front surface side of the movable roller 10L, as schematically shown in FIG. 12. The fixed roller 10J, the pressure roller 10P and the movable roller 10L form the operating force generating mechanism 10B.

Figure 6:
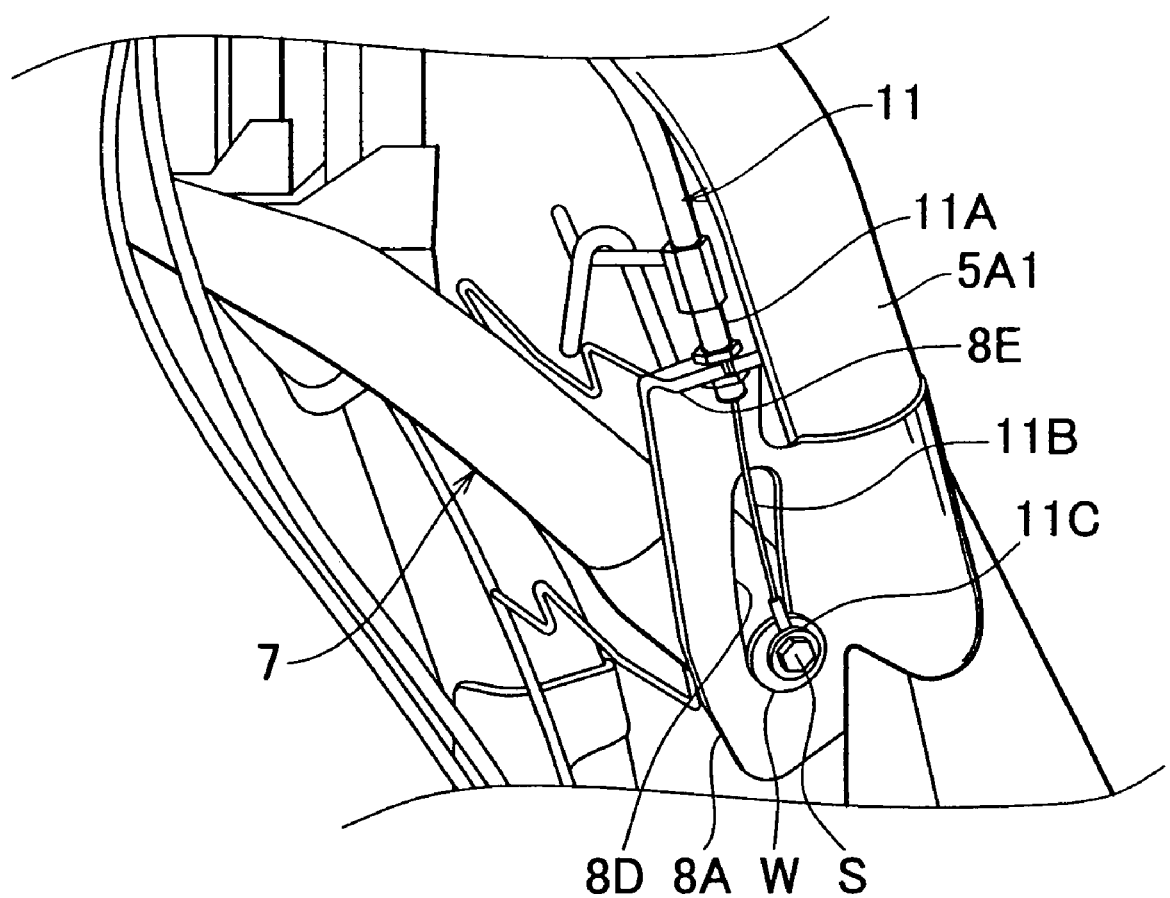
FIG. 6 is a perspective view showing the guide portion in FIG. 3, viewed from the rear.
Figure 7:
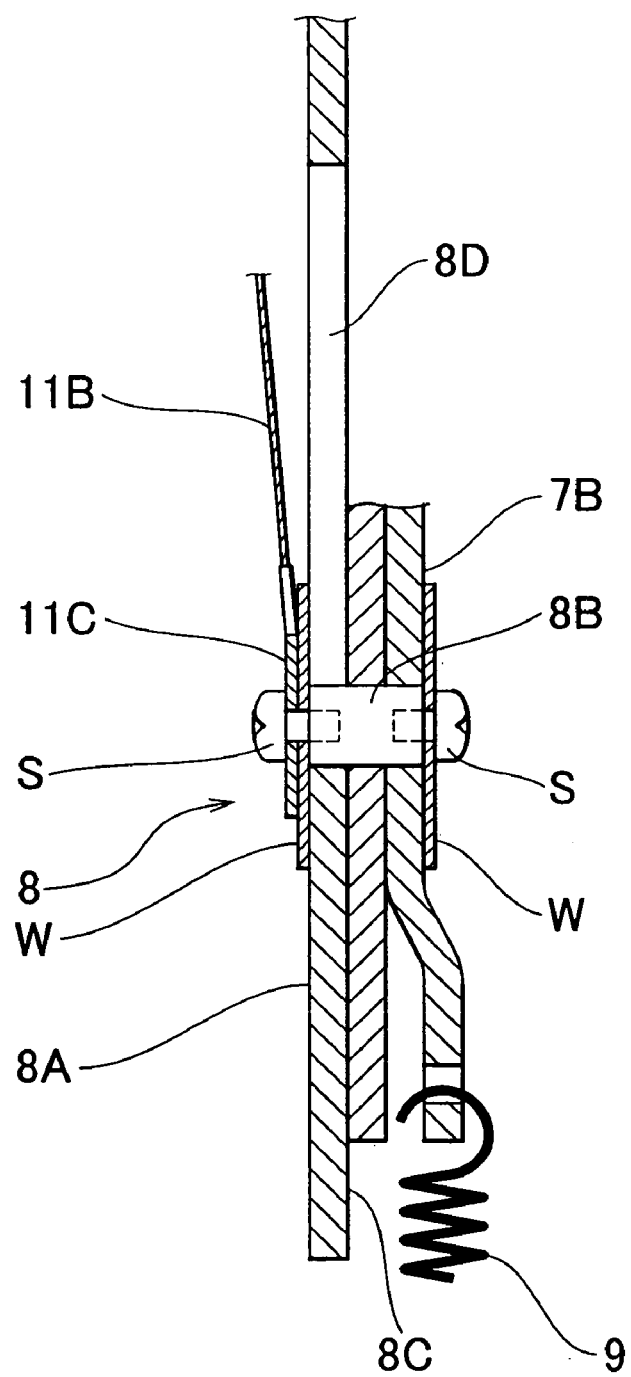
FIG. 7 is a cross sectional view showing a structure of the guide portion in FIG. 3.

Meanwhile, as shown in FIGS. 6 and 7, one of stopper rings 11C, 11C is fixed to the other end portion of one of the inner cables 11B, 11B, which comes out of the other end portion of one of the outer sheaths 11A, 11A. Similarly, the other stopper ring 11C is fixed to the other end portion of the other inner cable 11B, which comes out of the other end portion of the other outer sheath 11A. Each stopper ring 11C is fixed to the sliding pin 8B of the guide portion 8 along with the washer W by the set screw S.

Figure 13:
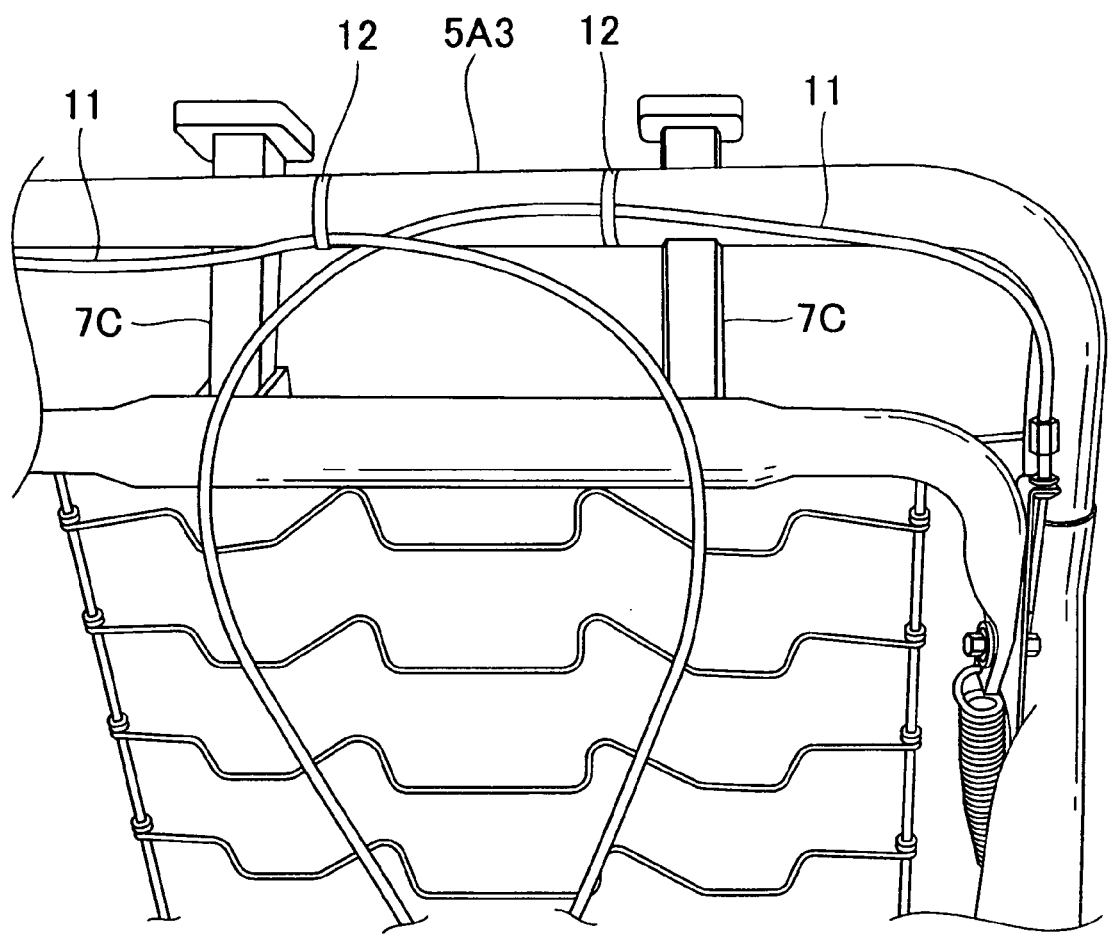
FIG. 13 is a rear view of an upper portion of a seat back frame, showing how pulling cable devices in FIG. 1 are routed.

As shown in FIG. 13, the paired pulling cable devices 11, 11 are routed such that the pulling cable devices 11, 11 cross each other, and each of the pulling cable devices is arranged in a shape with a gentle curvature on the rear surface side of the contour mat 6. Thus, the inner cables 11B, 11B are smoothly operated without being entangled with each other. An upper portion of one of the pulling cable devices 11, 11 is attached to one of the lateral pipe portions 5A3, 5A3 of the upper pile 5A of the seat back frame 5 by one of cable clips 12, 12. Similarly, an upper portion of the other pulling cable device 11 is attached to the other lateral pipe portion 5A3 of the upper pile 5A of the seat back frame 5 by the other cable clip 12.

In the thus configured vehicle seat according to the first embodiment, the headrest 4 is arranged at a position that is slightly apart from the head of the seated user in the rearward direction, when the seated user has his/her back against the seat back 3, that is, when the seated user is in the normal seated posture. When the seated user is in such a normal seated posture, if the vehicle is rear-ended and the lumbar part of the seated user moves rearward in reaction to the rear-end collision, the pressure plate 10A of the operating force generating means 10 embedded in the seat back 3 is moved rearward due to the load generated by the rearward movement of the seated user. The operating force generating means 10 is provided in an area near the pivot 2A of the seat back 3, and an amount of a positional displacement of the area, which is caused due to the rearward tilting of the seat back 3, is small. Accordingly, the pressure plate 10A is sufficiently moved rearward due to the load generated by the rearward movement of the lumbar part of the seated user, regardless of the amount of rearward tilting of the seat back 3.

Figure 14:
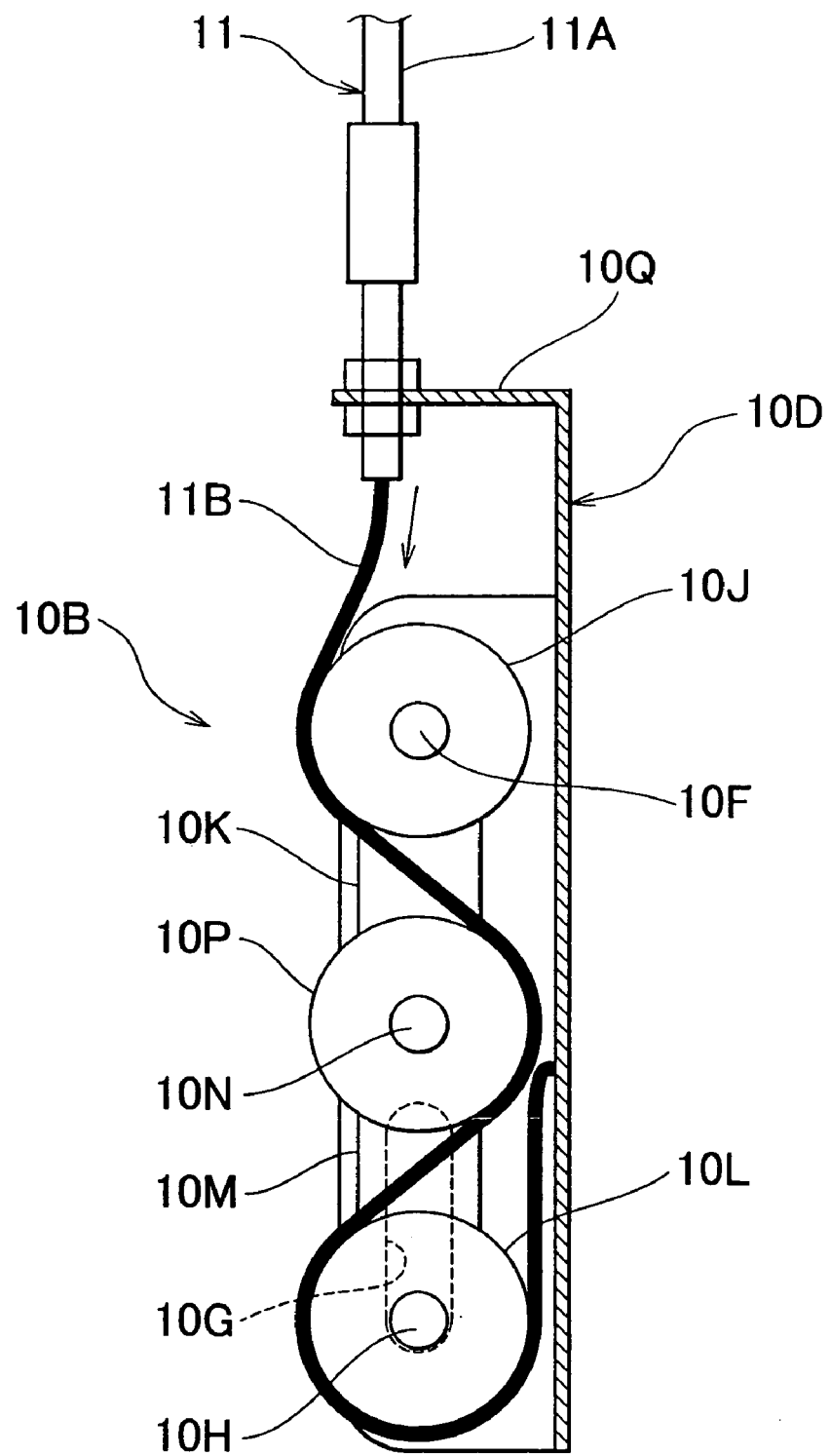
FIG. 14 is a side view schematically showing an operation state of the operating force generating mechanism in FIG. 12.

When the pressure plate 10A is sufficiently moved rearward, the pressure roller 10P of the operating force generating mechanism 10B, which is provided immediately behind the pressure plate 10A as a driven member, is pressed and moved rearward from the normal portion shown in FIG. 12. Since the operating force generating mechanism 10B is supported by the rigid lower frame 5C, the pressure roller 10P is sufficiently pressed and moved to the operation position shown in FIG. 14. In accordance with this movement, the movable roller 10L is moved to the downslide position shown in FIG. 14. As a result, the inner cables 11B, 11B, which come out of the one end portions of the respective pulling cable devices 11, 11 and which are placed on the pressure roller 10P and the movable roller 10L, largely deflect, and are sufficiently pulled in the direction shown by an arrow.

When the inner cables 11B, 11B are sufficiently pulled, each sliding pin 8B of the guide portion 8, which is coupled with the other end portion of the corresponding inner cable 11B by using the stopper ring 11C is moved upward along the guide hole 8D (refer to FIG. 7). In accordance with this movement, the lower end portions 7B, 7B smoothly move upward in a balanced manner against the spring tension of the tension springs 9, 9 (refer to FIGS. 4 and 5). One of the lower end portions 7B, 7B is positioned at the right end portion of the headrest frame 7, and the other lower end portion 7B is positioned at the left end portion of the headrest frame 7. As a result, the headrest frame 7 is smoothly moved upward along with the headrest supporting brackets 7C, 7C, and the headrest supporting brackets 7C, 7C are moved upward while being guided by the respective guide rings 5A4, 5A4, whereby the headrest 4 attached to the headrest supporting brackets 7C, 7C is instantaneously moved in the upward-forward direction, that is, toward the head of the seated user smoothly and reliably. One of the headrest stays 4A, 4A is arranged between the headrest 4 and one of the headrest supporting brackets 7C, 7C. Similarly, the other headrest 4A is arranged between the headrest 4 and the other headrest supporting bracket 7C.

With the vehicle seat according to the first embodiment, when the vehicle is rear-ended, the head rest 4 can be instantaneously moved in the upward-forward direction, that is, toward the head of the seated user smoothly and reliably, regardless of the amount of rearward tilting of the seat back 3. It is therefore possible to reliably reduce the impact on the neck of the seated user.

The vehicle seat according to the invention is not limited to the vehicle seat according to the first embodiment. Even if a modification is made to part of the components, the same effects as those of the first embodiment can be obtained. For example, the operating force generating means 10 shown in FIG. 1 may be replaced by operating force generating means 20 having a structure schematically shown in FIG. 15. In the operating force generating means 20, a pressure plate 20C is supported by a supporting bracket 20B forming an operating force generating mechanism 20A such that the pressure plate 20C is slidable in the front-and-rear direction.

The supporting bracket 20B has a vertically long groove shape whose front side is open. A backboard 20D of the supporting bracket 20B is fixed to the front surface of the rigid lower frame 5C by spot welding or the like. A fixed roller 20G is rotatably supported by right and left side walls 20E, 20E of the supporting bracket 20B by using a fixed shaft 20F, at a position between upper portions of the respective side walls 20E, 20E. A fixed roller 20J is rotatably supported by the right and left side walls 20E, 20E of the supporting bracket 20B by using a fixed shaft 20H, at a position between lower portions of the respective side walls 20E, 20E. A space, into which a movable roller 20Q to be described later can enter, is reserved between the fixed roller 20G and the fixed roller 20J.

A cable stopper piece 20K, which extends forward, is formed in an upper portion of the backboard 20D of the supporting bracket 20B. One end portions of the outer sheaths 11A, 11A of the respective pulling cable devices 11, 11 are fixed to the cable stopper piece 20K. One end portions of the inner cables 11B, 11B which come out of the one end portions of the respective outer sheaths 11A, 11A are fixed to the backboard 20D of the supporting bracket 20B. The inner cables 11B, 11B are routed on the front surface side of the fixed roller 20G, the front surface side of the fixed roller 20J, and the bottom surface side of the fixed roller 20J.

The pressure plate 20C is arranged in a vertical direction ahead of the operating force generating mechanism 20A. Paired right and left stays 20L, 20L are attached to the rear surface of the pressure plate 20C such that one of the stays 20L, 20L protrudes from an upper end portion of the pressure plate 20C, and the other stay 20L protrudes from a lower end portion of the pressure plate 20C. A long hole 20M extending in the front-and-rear direction is formed in each stay 20L. Also, a support arm 20N is provided on the rear surface of the pressure plate 20C at a center portion in the vertical direction. The movable roller 20Q is rotatably supported by an end portion of the support arm 20N using a support pin 20P.

Guide pins 20R, 20R are provided so as to extend in the horizontal direction. One of the guide pins 20R, 20R is provided in a front side of the upper end portions of the right and left side walls 20E, 20E of the supporting bracket 20B, and the other guide pin 20R is provided in a front side of the lower end portions of the right and left side walls 20E, 20E. By fitting the guide pins 20R, 20R in the respective long holes 20M, 20M of the stays 20L, 20L, the pressure plate 20C is supported by the supporting bracket 20B so as to be slidable in the front-and-rear direction. In this state, the movable roller 20Q is arranged ahead of the inner cables 11B, 11B of the respective pulling cable devices 11, 11, and the movable roller 20Q faces the fixed roller 20G and the fixed roller 20J of the operating force generating mechanism 20A so as to be able to enter the space between the fixed roller 20G and the fixed roller 20J.

Figure 15:
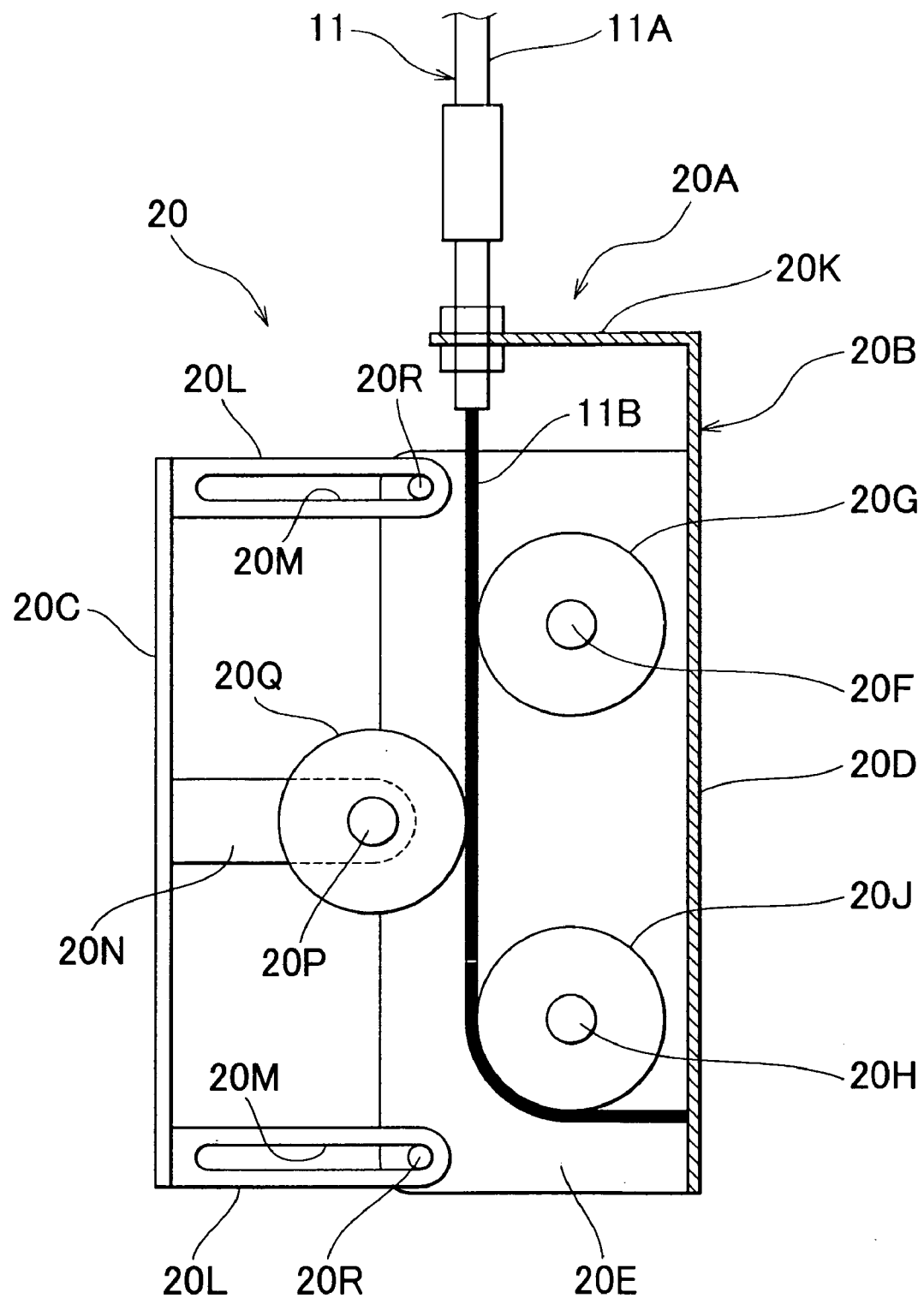
FIG. 15 is a side view schematically showing a structure of a modified example of the operating force generating means in FIG. 1.
Figure 16:
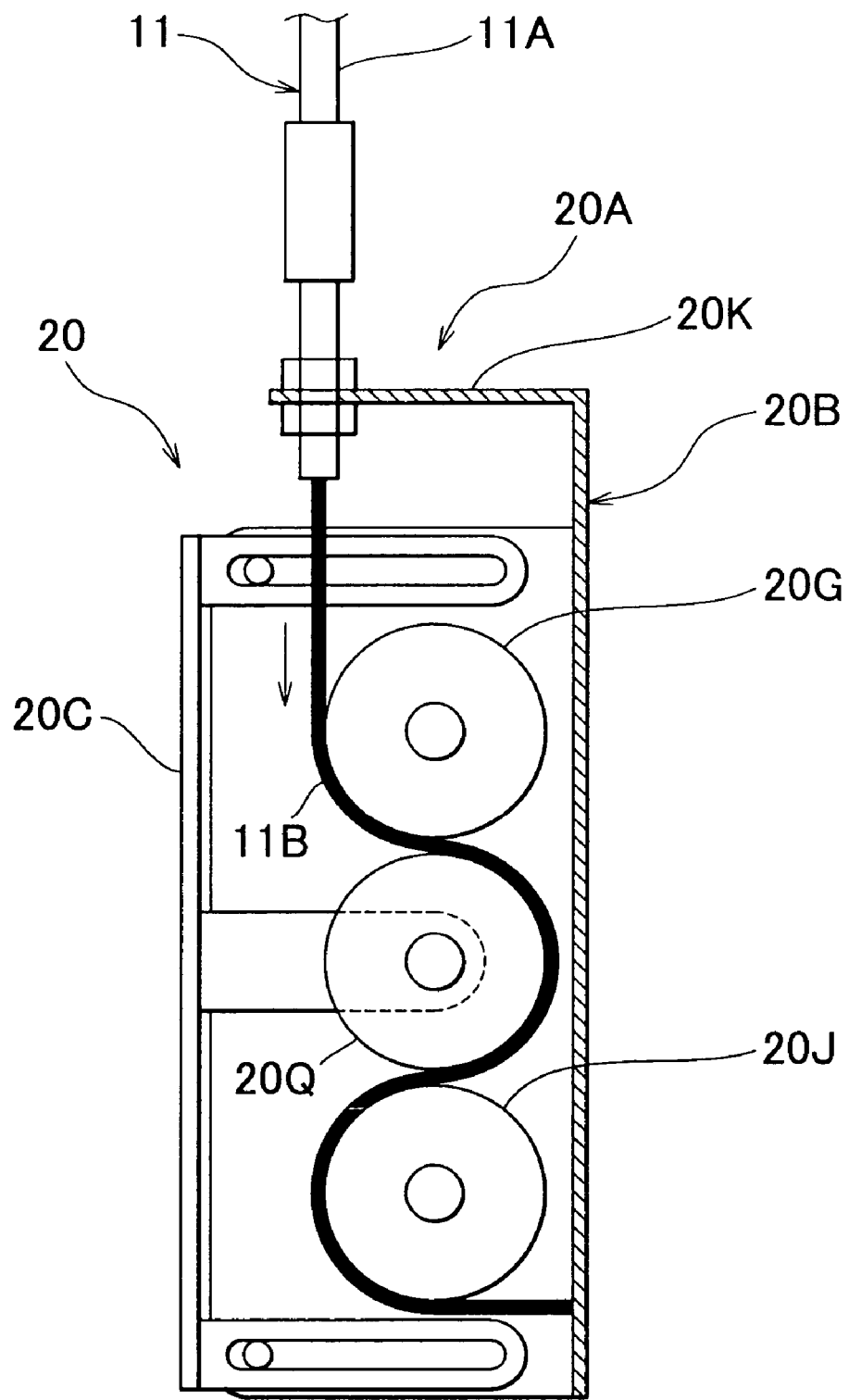
FIG. 16 is a side view schematically showing an operation state of the operating force generating means in FIG. 15.

In the operating force generating means 20 shown in FIG. 15, when the vehicle is rear-ended and the lumbar part of the seated user moves rearward in reaction to the rear-end collision, the pressure plate 20C is sufficiently moved rearward due to the load generated by the rearward movement so as to be closer to the supporting bracket 20B of the operating force generating mechanism 20A, as shown in FIG. 16. Then, the movable roller 20Q is pressed so as to be positioned between the fixed roller 20G and the fixed roller 20J. As a result, the inner cables 11B, 11B which come out of the one end portions of the respective pulling cable devices 11, 11 largely deflect, and are sufficiently pulled in the direction shown by an arrow. Accordingly, in the vehicle seat including the operating force generating means 20 shown in FIG. 15, the same effects as those in the first embodiment can be obtained.

What is claimed is:

1. A vehicle seat, comprising:
   a seat back frame;
   headrest supporting brackets which are provided in a seat back, and to which a headrest is attached;
   a headrest frame which is movably coupled with the seat back frame such that the headrest can be moved toward a head of a seated user;
   a pivot which tiltably supports the seat back frame;
   an operating force generating device which is provided near the pivot, and which generates an operating force when receiving a load generated by a rearward movement of the seated user;
   an operating force transmitting device which moves the headrest frame in accordance with an operation of the operating force generating device, wherein;
   the operating force transmitting device is formed of paired pulling cable devices;
   the operating force generating device is configured such that a driven member is arranged ahead of an inner cable of each pulling cable device; and
   the driven member when pressed and moved due to the load generated by the rearward movement of the seated user, pulls the inner cables of the respective pulling cable devices, whereby the inner cables are deflected.

2. The vehicle seat according to claim 1, wherein the operating force generating device is supported by the seat back frame.

3. The vehicle seat according to claim 2, wherein a portion of the seat back frame, which supports the operating force generating device is a lower frame forming a lower portion of the seat back frame.

4. The vehicle seat according to claim 1, wherein the operating force generating device includes a pressure plate which receives the load generated by the rearward movement of the seated user, thereby pressing and moving the driven member.

5. The vehicle seat according to claim 4, wherein the pressure plate is provided in at least a lower half area of the seat back.

6. A vehicle seat, comprising:
   a seat back frame;
   headrest supporting brackets which are provided in a seat back, and to which a headrest is attached;
   a headrest frame which is movably coupled with the seat back frame such that the headrest can be moved toward a head of a seated user;
   a pivot which tiltably supports the seat back frame;
   operating force generating means for generating an operating force when receiving a load generated by a rearward movement of the seated user, the operating force generating means being provided near the pivot;
   operating force transmitting means for moving the headrest frame in accordance with an operation of the operating force generating means, wherein;
   the operating force transmitting means is formed of paired pulling cable devices;
   the operating force generating means is configured such that a driven member is arranged ahead of an inner cable of each pulling cable device; and
   the driven member when pressed and moved due to the load generated by the rearward movement of the seated user, pulls the inner cables of the respective pulling cable devices, whereby the inner cables are deflected.

* * * * *